July 24, 1934.    J. A. PILCHER    1,967,512
LATERAL STOPS IN A JOURNAL BOX
Filed Jan. 14, 1931

INVENTOR.
John A. Pilcher.

Patented July 24, 1934

1,967,512

UNITED STATES PATENT OFFICE 1,967,512

LATERAL STOPS IN A JOURNAL BOX

John A. Pilcher, Roanoke, Va., assignor to Western Railway Equipment Company, St. Louis, Mo., a corporation of Missouri Application January 14, 1931, Serial No. 508,605

4 Claims. (Cl. 308—40)

My invention relates to improvements in the ordinary recognized journal or oil box for railway vehicles, by the introduction of lateral stops and other parts for the purpose of preventing harmful lateral, or fore and aft movement of the journal on its bearing that, with the present form of construction, opens a gap between the journal and the bearing and allows the waste, with which the journal box is packed, to insert itself between the journal and the bearing under certain conditions of the impact of cars, one against the other and under certain conditions of braking while the cars are moving, and to prevent the waste reaching the bottom of the bearing.

In the drawing, Figure 1, represents a vertical longitudinal section through the journal box on the line of the axis of the journal.

Figure 4 is a half horizontal longitudinal section on the line 4—4 of Figure 1.

Figures 1, 2, 3:
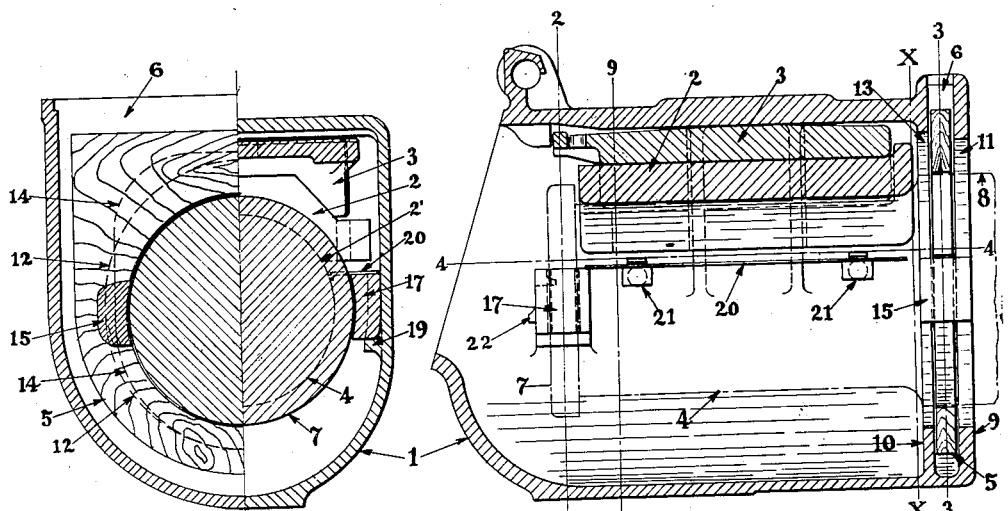
Figure 2 is a half transverse section of the journal box on the line 2—2 of Figure 1.
Figure 3 is a half transverse section of the journal box on the line 3—3 of Figure 1.

The numbers in the various figures and views represents the same parts. The number 1 is the journal box; 2 is the journal bearing; 3 is the journal box wedge; 4 is the journal shown by dot-and-dash lines in Figures 1 and 4; 5 is the dust guard shown in the dust guard pocket 6; 7 is the collar on the end of the journal; 8 is an enlarged part of the axle adjacent the inside end of the journal 4, which is usually made the same diameter as the collar 7, which is also an enlarged part of the axle adjacent the journal. In the usual form of construction of the journal box, the dust guard pocket 6, has an outer wall 9, and an inner wall 10. The periphery of the opening 11, in the outer wall of the dust guard slot is shown by lines of a circle 12. The periphery of the opening 13, in the inner wall of the dust guard pocket is shown by the lines 14, Figure 3 is of a semi-circular form at the bottom with straight vertical lines on each side and with a straight horizontal line at the top, the horizontal line at the top being connected with the vertical side lines by a circular arc at each top corner. This description of the openings in the inside end of the journal box is of the box as ordinarily constructed. Journal boxes can be made with the openings of other form and serve for holding the stops hereinafter described.

The openings 11 and 13 have been made liberal in size, larger than the parts of the axle that are passed through them to allow for any irregularity in the size of the holes in the process of manufacture and for any irregularity of the interior of the journal box that might affect the location of the axle in the box. The space in the openings below the axle at the portion 8, are sufficient to allow the jacking up of the box to place and remove the bearing and wedge. This space around the portion of the axle 8, in the holes 11 and 13, allows room for the journal to roll to one side and rest momentarily on the edge 2', of the bearing 2, under the forces of inertia of the wheels and axles with the impact of one car against another, or under the forces from brake application when the car is in motion.

By inserting into the inner periphery of the dust guard 5, a stop 15, made of a material such as steel, copper, lead or fibre, in close proximity to the axle on its inner face and bearing, with its flanges against the periphery of the openings 11 and 13, in the walls of the dust guard pocket 6, the lateral or fore and aft movement of the axle and its journal in the box, and of the journal in its bearing will be limited to a harmless amount, and will, at the same time, allow the insertion of anti-waste grab device, 20, of relatively thin material that need not be strong enough to resist the force of the journal on impact of the cars. This same stop will also prevent damage to the sides of the dust guards from the lateral force on the axle under the same kind of impact.

This stop 15 can be made of a material like copper, lead, or fibre, of some kind that will compress under a severe blow and relieve the journal box of some of the force which in extreme cases breaks the box.

Service and special tests have demonstrated the fact that under some circumstances such as the impact of one car against another, the hard application of the brake with the car moving, and with an application of the hand brake, with the power brake already set hard, where the forces of the two coincide and accumulate in excessive braking forces, the journal does roll out of its seat until the portion of the axle at 8, comes in contact with the side of the nearest periphery of the openings 11 or 13, of the dust guard pocket 6, which limits its further movement in the box and correspondingly in the bearing.

The stops 15, which are placed on each side of the openings in the dust guard walls, are made to approximately fit the periphery of the axle on one side and to fit the peripheries of the openings 11 and 13, in the dust guard pocket walls on the other side. To hold this stop 15, in place after the axle has been inserted to its normal position in the box, a projecting web 16, is made on the stop 15. After the dust guard 5 is placed in its slot 6, the stop 15 is inserted in its place in notches cut in the inner periphery of the dust guard. The insertion of the axle to its normal position locks the stop to its proper place to function as a stop to any excessive and harmful lateral movement of the axle in its box, or of the journal in its bearing. When the box is jacked up for either the placing or the removal of the bearing, the dust guard which fits the axle snugly has to move, relative to the box, along with the axle. The stop 15 being held by the dust guard has also to move vertically with the dust guard in the box.

Since the peripheries of the openings in the dust guard pocket walls, as described for existing boxes, against which the stops bear are not entirely in vertical planes, the stops cannot be made to bear against the periphery of these openings 11 and 13, for the entire surface and allow the needed vertical movement of the journal box relative to the dust guard and axle, unless there is either a straight vertical surface on the stop 15, adjacent the axle, or a sufficient clearance between the axle and the face of stop 15, to allow room for this vertical relative movement. The portion of the stops 15, where they come against the periphery of the openings 11 and 13 of the dust guard pocket walls can be so formed as to allow the necessary relative vertical movement of the journal box and the dust guard and confined stops by the sacrifice of some of the bearing surface at the contact between the stop 15, and the box. This sacrifice of bearing surface can be obviated by modifying the form of the periphery of the openings 11 and 13, in the dust guard wall pockets so as to have sufficiently long vertical portions for contact with the stop 15, and in addition, enough for the needed relative vertical movement between the journal box and the dust guard to allow the box to be jacked up relative to the axle to allow the placing and removing of the journal bearing and its holding wedge. New boxes could be made with the inner surface of the dust guard wall openings made vertically straight for a sufficient distance to allow the needed relative vertical movement of the dust guard and the box in the jacking up of the box to place or remove the bearing.

The periphery of the dust guard wall openings opposite the enlarged portion of the axle 8 can be so located with reference to surface of this portion of the axle as to limit the harmful lateral movement of the axle in the journal box. Such a location is shown at 15' in Figure 5, which gives a half sectional view of the axle at the portion 8, and a half section of the box 4, on the line X—X, Figure 1, showing suggested form, marked 12 and 14, Figure 5, the periphery of the openings 11 and 13, in the dust guard pocket walls.

Figures 5, 6, 9, 10:
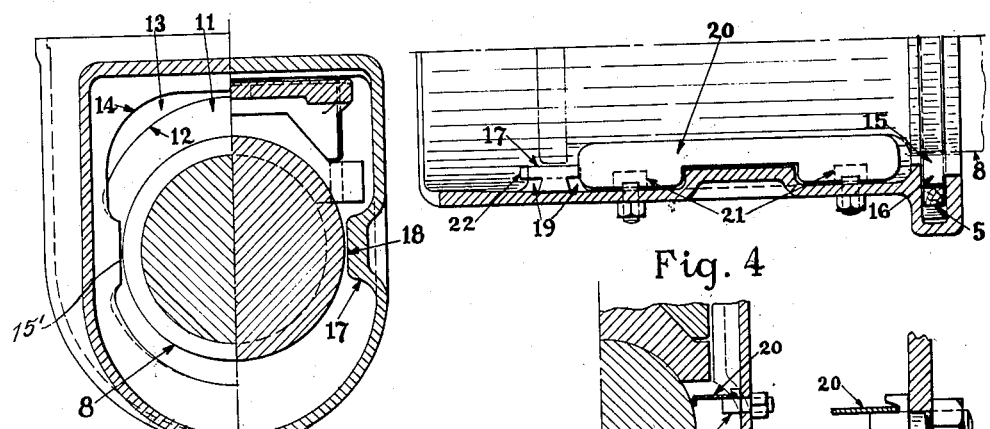
Figures 5 and 6 are half transverse sections of a journal box taken on line X—X and 2—2, respectively, of Figure 1, but showing another form of stop than that shown in Figure 1.
Figure 9 is a partial transverse section taken on the lines 9—9 of Figure 1.
Figure 10 is an enlarged view of the parts 20 and 21, shown in Figure 9.

In this Figure 5 the surface of the stop 15', next the surface of the axle is shown vertical and straight but it can be made to practically conform to the surface of the abutting portion of the axle, by limiting its depth in proportion to its distance from the axle, and still allow the needed vertical movement of the axle in the box and at the same time prevent any harmful lateral movement of the axle relative to the journal box.

The peripheries 12 and 14 of the dust guard wall openings 11 and 13, can be made vertically straight and true, without any special projection as shown at 15', and at the proper distance from the enlarged portion of the axle 8, adjacent the journal 4, to limit the harmful lateral movement of the axle relative to the journal box. Such a form would not be a preferred form, even for a new box as it would have to be more exactly made as to dimensions, or finished off with more difficulty to allow the needed clearance for the proper adjustment of the journal in the box than where the projections are used as shown at 15' in Figure 5, or the stops 15, in Figure 3.

Figures 7, 8:
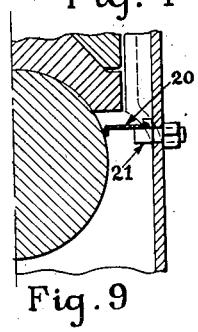
Figure 7 is a partial transverse section of a journal box, taken on the line 2—2 of Figure 1, but of another form of stop than that shown in Figure 1.
Figure 8 is a partial horizontal longitudinal section on the line 8—8 of Figure 7.

In the inside of the journal box, on each side, approximately on the horizontal center line of the journal, when in its normal position and abutting the collar 7, on the end of the axle there is placed a stop 17, to be made of material similar to stop 15, which can be used in conjunction with stop 15, or alone, to serve the same purpose as has been set forth for stop 15. When stops 17 are used without stops 15, or when stops 15 are used without stops 17, either will prevent the harmful movement of the journal in its bearing, but the forces preventing the movement will react at either one or the other end of the journal box and set up lateral bending forces in the frame to which the journal box is attached. The use of the two sets of stops 15 and 17, jointly, and properly adjusted, will equalize the forces and prevent the lateral bending of the frame holding the journal boxes. Where the frame is sufficiently strong, which evidently is mostly the case, one set of the stops, either 15, or 17, will suffice and be less costly.

Where the stop 17 is made with a vertical face as in Figure 6, it can be cast integral with the box, since with the straight face at 18, shown in conjunction with the semi-periphery of the axle collar 7, it is evident there can be gotten all the needed relative vertical movement of the axle in the box to permit the jacking up of the box to place and remove bearings. This stop 17 can also have its face abutting the collar made approximately to conform to the circular surface of the collar by limiting its depth in proportion to the clearance between the abutting surfaces, thus allowing the needed relative vertical movement and at the same time preventing harmful lateral movement of the journal relative to the journal box. While this lug 17, Figure 6, can be cast integral with the box, a similar lug, with a straight face 18, can be cast separately and attached to the inner surface of existing journal boxes. It is preferable, however, that the stop 17 should have a face conforming approximately with the periphery of the axle collar. Such a stop is shown in Figures 1, 2 and 4, at 17. This stop is made with its face next the periphery of the axle collar to coincide approximately with the periphery of the axle collar, giving a good bearing surface when they come in contact under impact. In this form the stops are removably attached to the inside of the journal box by being placed in pockets cast integral with the box as shown for new boxes, or in similar pockets made separately and attached to the inner surfaces of the journal box, as shown in Figures 7 and 8, which show the transverse horizontal sections separately of such a separate pocket.

By making the stop 17 separate from the box, it can not only be made to conform to the periphery of the axle collar, but will allow the choice of materials, such as copper, lead or fibre, to partially absorb the shocks of impact, where the contact surface of the stop 17, approximately coincides with the periphery of the axle collar it (the stop) will have to move vertically, relative to the axle, when the box is jacked up for the placing or removing of the bearings. The surface of the stop 17, where it comes in contact with the supporting lugs 19, in Figures 2, 7 and 8, on account of having to partially follow the relatively vertical movement of the box, with the axle, will have to be fitted against its backing up surfaces in such a manner as to be snug and in contact when in the normal position, and to allow a partial relative movement around the periphery of the axle when being lifted vertically relative to the axle. These curved surfaces can be thus worked out. The removable lugs 17, are to have on them projections 22, to receive the end of the tool that will be used to pry them up on their supports sufficiently ahead of the vertical movement of the journal box, relative to the axle, so that the curved surface of the stop will not bind on the axle. In some forms of construction of this removable lug 17, the end of the tool used as a pry can be placed under the bottom of the lug.

As an extra precaution against the catching of waste between the journal and its bearing, where a journal, worn down in size, has placed on it a normal sized bearing (bearings are usually carried in stock only for normal sized journals, while the journals get smaller to a definite limit as they wear) allowing an opportunity for such a happening, even with the use of the stops to prevent harmful relative movement of the journal in its bearing, there are provided relatively thin pieces of material 20, Figures 1, 2 and 4, interposed laterally between the journal and the sides of the box and cutting off the waste pocket in the journal box from that portion of the box containing the bearing, thus preventing the waste from getting to the bottom of the bearing, where the turning of the journal and the adhesion of the oil might drag the waste between the journal and its bearing.

This waste grab preventer 20, is carried on supports 21, which may be inserted in existing boxes or made integral with new boxes. This waste grab preventer 20, is made so it can be placed on its supports after the journal end of the axle has been inserted in the box, but before the bearing is placed. It is so located below the bearing that there is room between it and the bearing for it to move with the jacking up of the box relative to the bearing to allow sufficient room for the wedge 3, to be placed in the journal box and to be removed therefrom. This will give the needed room for placing and removing the bearing in the box.

The waste grab preventer 20, must rest on its supports in such manner and be made of such length to have sufficiently free movement and end clearance that it will not get locked between the wall of the dust guard pocket and the axle collar with the extreme movement of the axle relative to the box in the direction of its axis, and to allow its free movement with the movement of the axle in the direction of its axis.

The supports 21 for the waste grab preventer 20, must be so formed as not only to support the device, but to prevent the outer edge from rising, which would allow the inner edge adjacent the periphery of the journal to droop and get out of close proximity with the journal, forming a considerable opening. The shape of these center supports is shown enlarged in Figure 10, which is a small partial cross-section of the side of the box, taken on the line 9—9 of Figure 1. The top portion of the support 21, is shown curved in such manner as to allow the lifting of the waste grab preventer from its supports with the journal in place, and the bearing removed and will at the same time hold down the outer edge of the waste grab preventer 20, and prevent the drooping of its inner edge (that next to the journal). The inner edge of the waste grab preventer 20, has a downward flange close to the surface of the journal to give stiffness and at the same time to turn the shifting waste away from the necessary small opening between the surface of the journal and the edge of the waste grab preventer.

Having described my invention, I claim the following:

1. In a device of the class described, the combination with a journal box, the lower part of said box forming a chamber containing oil retaining packing, of an axle positioned in said box and provided with a reduced bearing portion, a brass situated between the top of the box and the axle and cooperating with the reduced bearing portion, a pair of stops carried by the box, one at each side of the axle, in proximity to a full diameter portion thereof to prevent substantial lateral movement of the axle relative to the box, and guards extending between the walls of the box and the reduced bearing portion of the axle to prevent access of the packing to the brass.

2. In a device of the class described, the combination with a journal box, of an axle positioned therein, a brass situated between the top of the box and the axle and bearing on the upper part of the latter, said journal box having a dust guard pocket, a dust guard in said pocket and provided with recesses, and stops in said recesses extending between the axle and the pocket walls to prevent substantial lateral movement of the axle relative to the box.

3. In a device of the class described, the combination with a journal box, the lower part of said box forming a chamber containing oil retaining packing, of an axle positioned in said box and provided at its front end with a collar projecting laterally beyond its bearing surface, the roof of the box extending beyond the axle collar, a brass in said box bearing only on the upper part of the axle, and a pair of rigid stops carried on the box walls, said stops being approximately in contact with said collar whereby appreciable lateral movement of the axle relative to the box and consequent separation of the axle and brass are prevented, said stops being so formed and positioned as to permit the vertical and longitudinal movement of the axle necessary for the withdrawal of said axle from the box.

4. In a device of the class described, the combination with a journal box, of an axle positioned therein and provided at its front end with a collar projecting beyond its bearing surface, a pair of waste guards of relatively weak material positioned between the bearing surface of the axle and the box, and a pair of stops carried on the box wall and engaging with the periphery of the collar to limit the lateral movement of the axle to prevent injury to the waste guards.

JOHN A. PILCHER.